Sept. 25, 1962  W. DU BROFF ET AL  3,055,478
CASE HANDLING EQUIPMENT
Filed Feb. 19, 1960  5 Sheets-Sheet 1
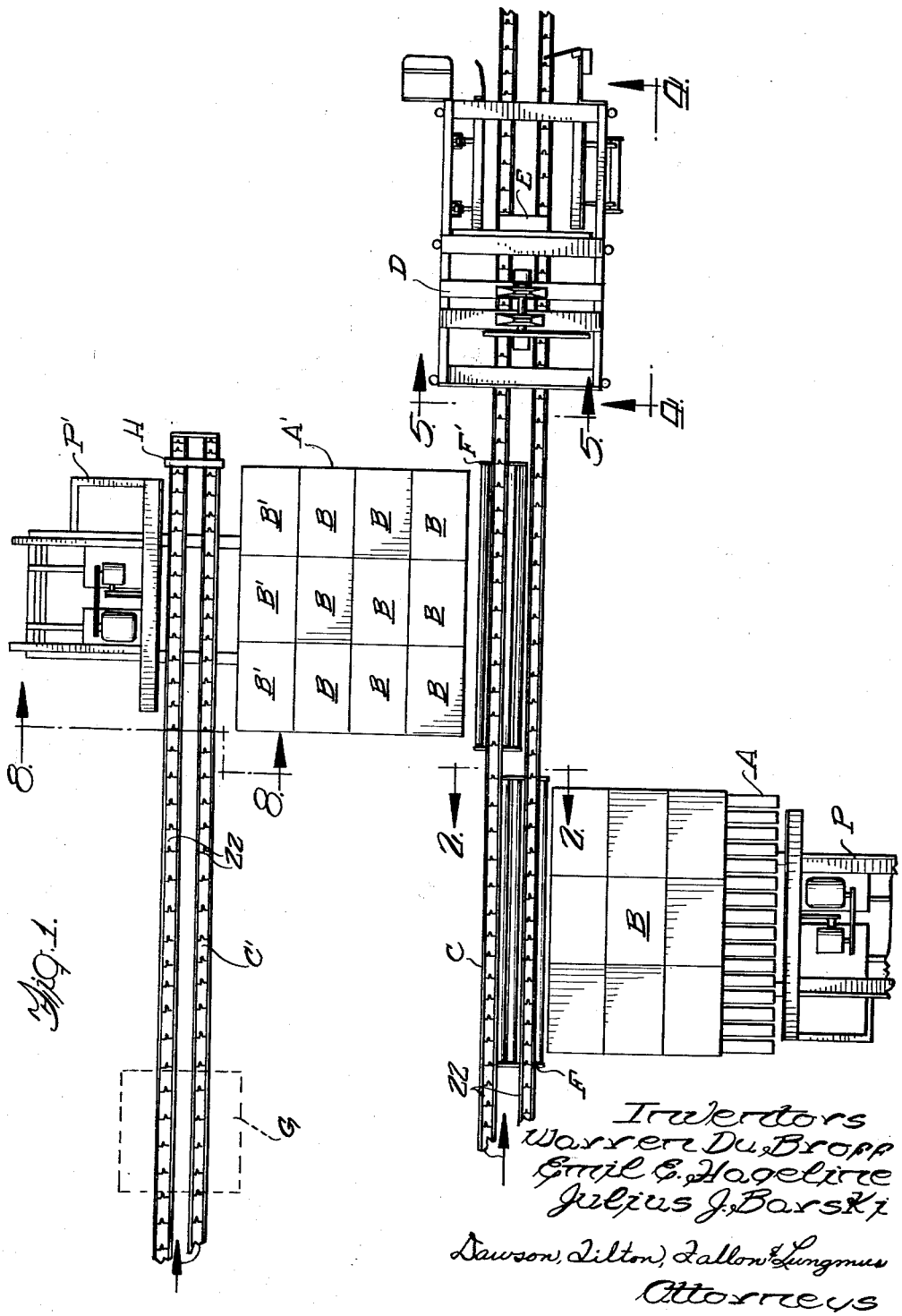

Sept. 25, 1962
W. DU BROFF ET AL
3,055,478
CASE HANDLING EQUIPMENT
Filed Feb. 19, 1960
5 Sheets-Sheet 2
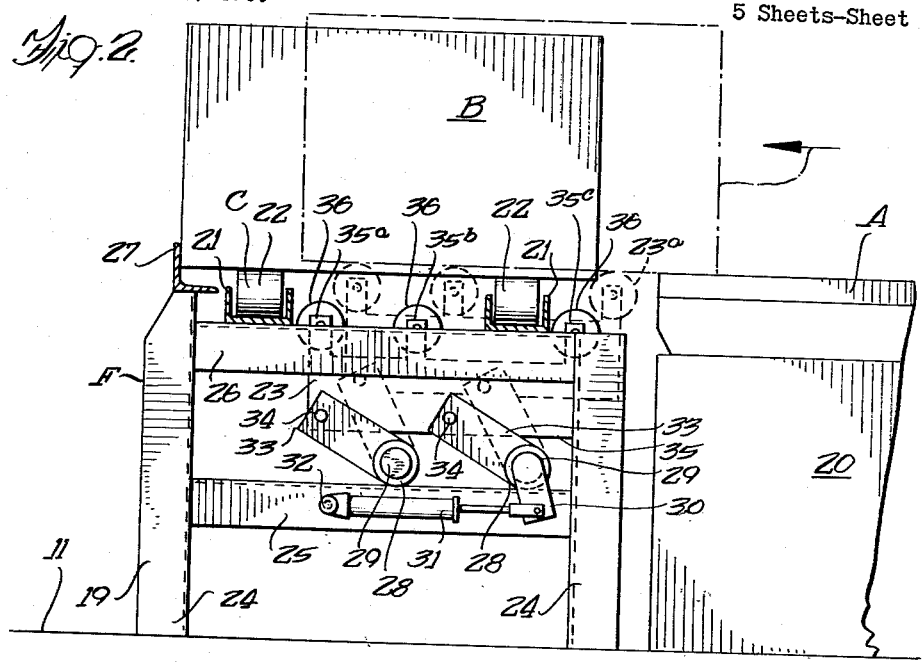
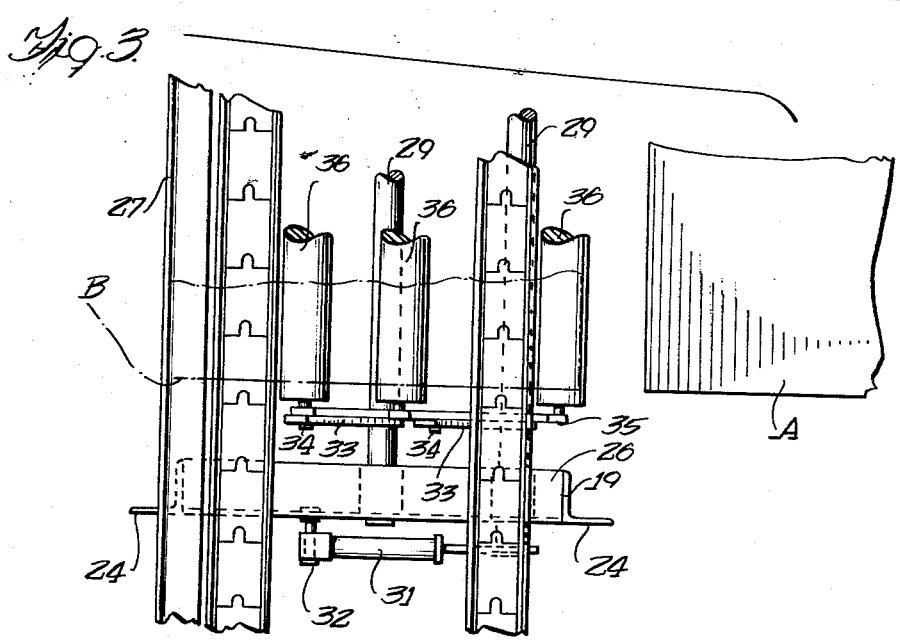
Inventors
Warren Du Broff
Emil E. Hagelfire
Julius J. Barski
Dawson, Tilton, Fallon & Lungmus
Attorneys

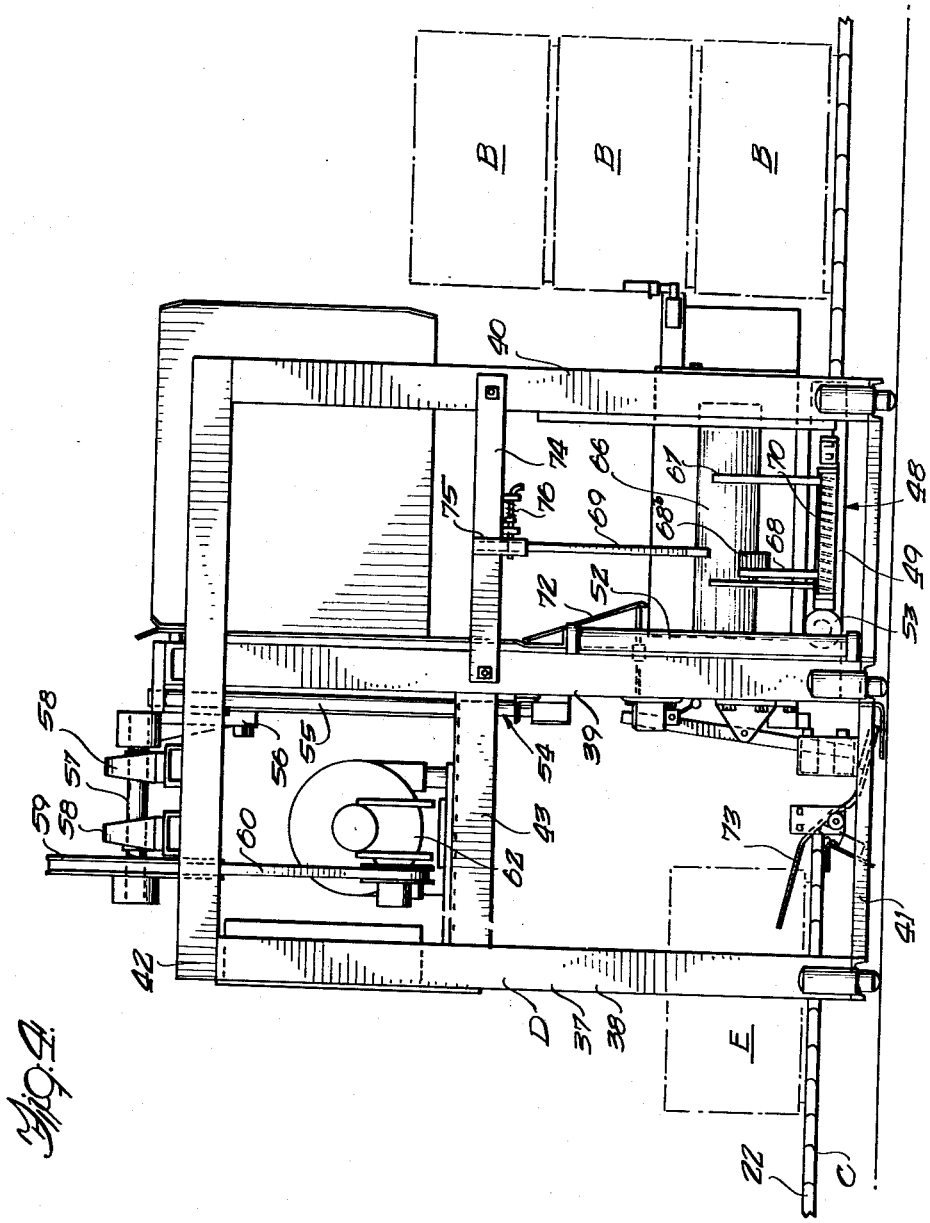

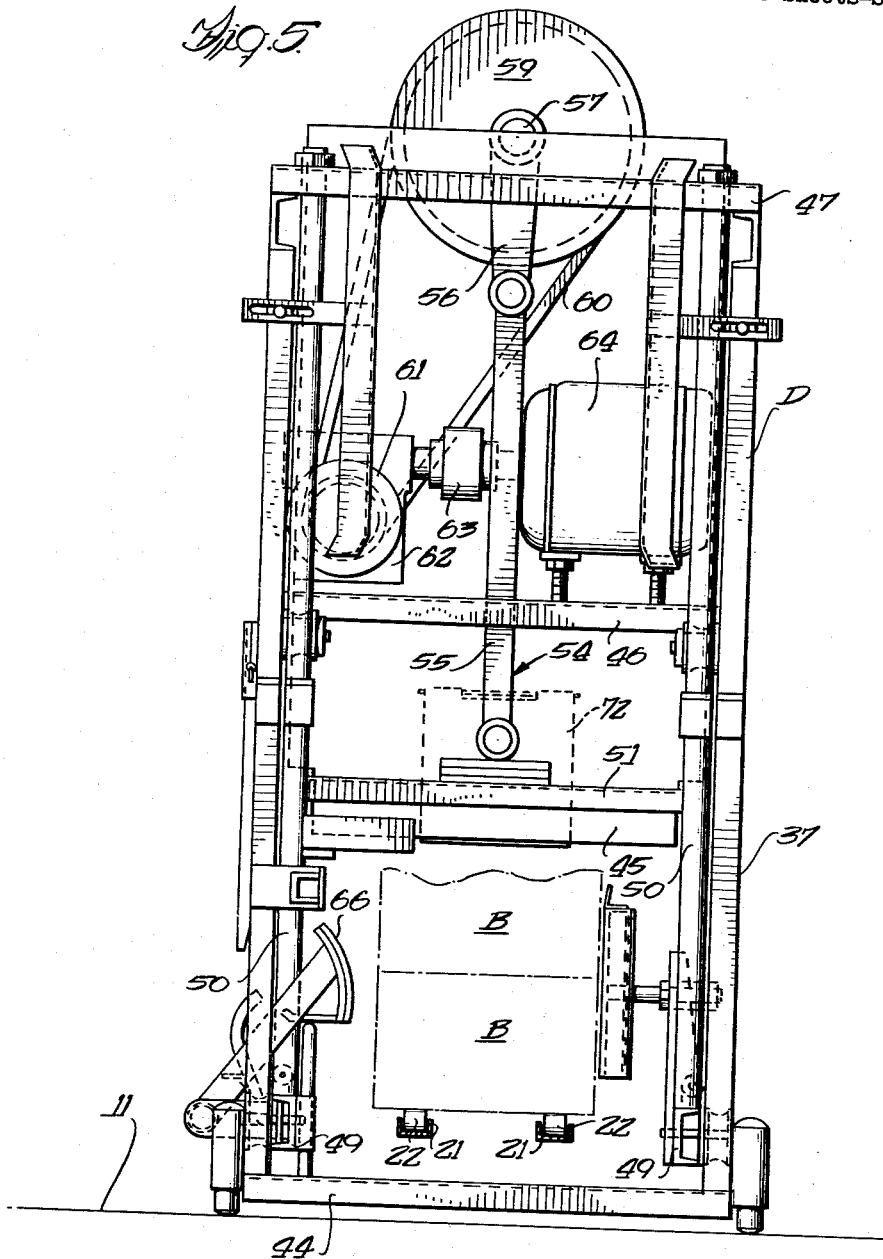

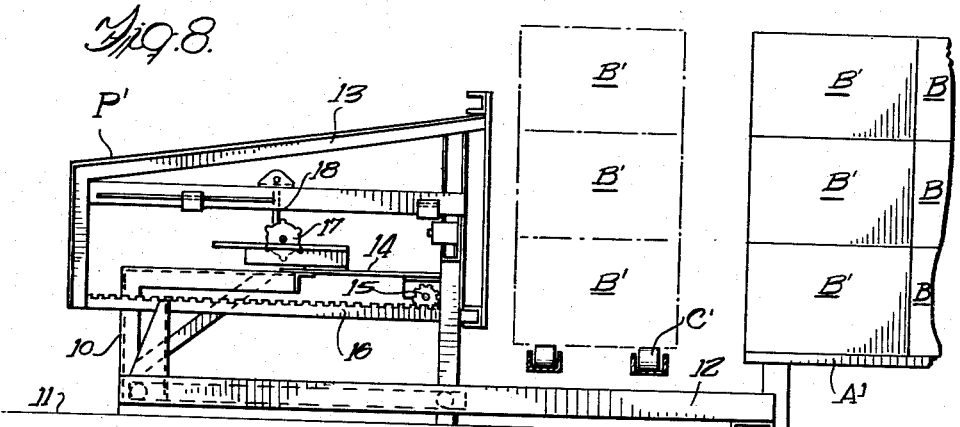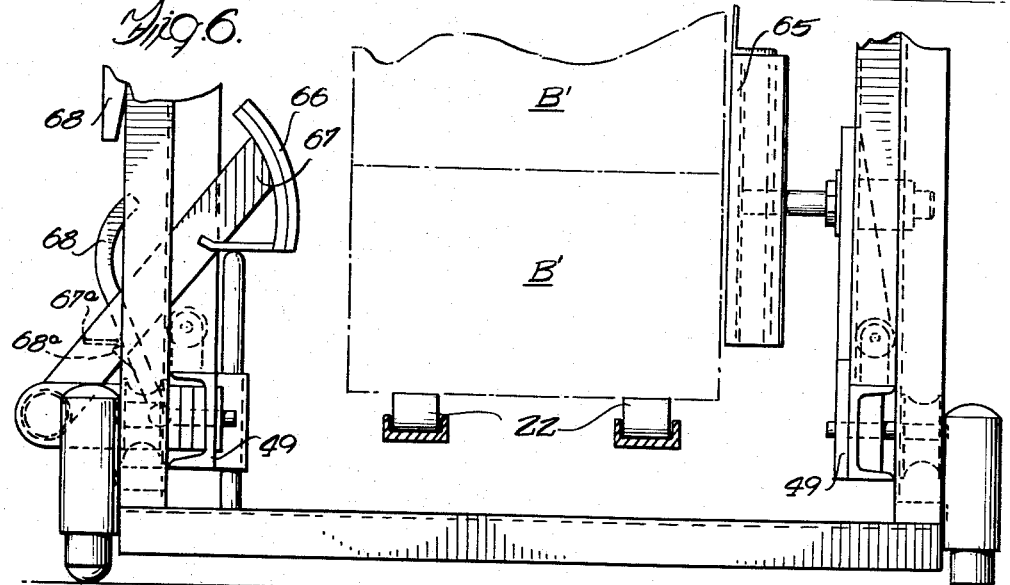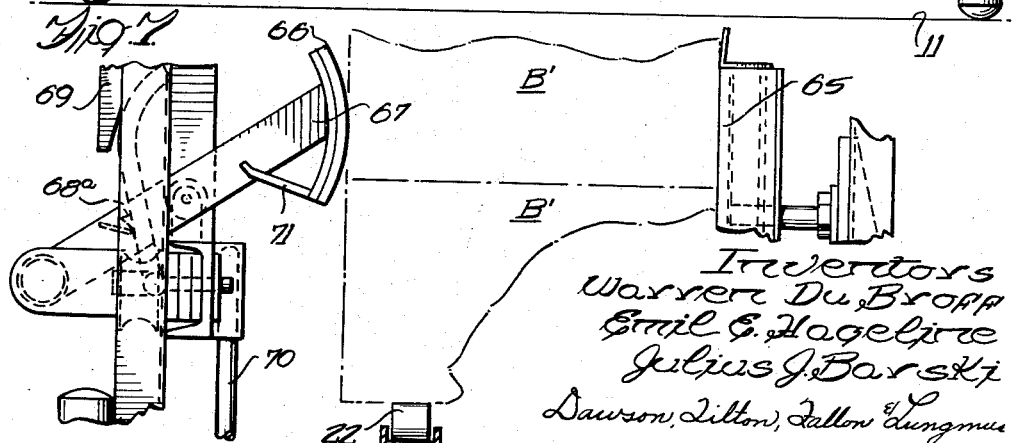

United States Patent Office 3,055,478
Patented Sept. 25, 1962

3,055,478
CASE HANDLING EQUIPMENT
Warren Du Broff, Highland Park, and Emil E. Hageline and Julius J. Barski, Chicago, Ill., assignors, by mesne assignments, to Warren Du Broff, Highland Park, Ill.
Filed Feb. 19, 1960, Ser. No. 9,767
3 Claims. (Cl. 198—27)

This invention relates to case handling equipment and, more particularly, to equipment for moving and/or arranging cases which are ordinarily provided in a vertically stacked position.

In the storage and handling of cases of goods, whether the cases be cartons, drums, boxes, etc., it has been found convenient to arrange the cases in vertical stacks on a pallet or other platform-providing surface. When this is done, a relatively large number of cases can be readily transported from one place to another by means of a lift truck.

Inasmuch as the cases are usually employed in some kind of manufacturing operation, it is usually necessary to relocate the cases relative to a pallet from time to time. For example, it may be necessary to remove the cases from the pallet and place them on a conveyor so that the cases will be emptied or filled, as the case may be. Thereafter, the cases usually are returned to the pallet for shipment or storage. Heretofore, in large measure, many of the transferring operations alluded to were carried out by manual labor. This is not only costly, but was attended by breakage, misoperation, and the like. It is to be appreciated that if a case is imperfectly positioned in a packaging line, the possibility of jamming arises. A portion of this problem has been solved through apparatus embodying the teachings of the co-owned, copending application of Warren Du Broff, Serial No. 792,829, filed February 12, 1959, now abandoned, and reference may be had to that application for details of construction not herein given.

An important object of this invention is to provide apparatus that utilizes the invention described in the above-identified application and goes forward to provide novel structures for a substantially completely integrated operation in the handling of cases. Through the practice of the instant invention, it is now possible to depalletize, destack, upstack, and re-palletize cases, all without the application of human effort.

Another object of the invention is to provide equipment especially suited for the palletizing of cases, especially cases which are arranged in vertical stacks. Here, it is to be appreciated that ruggedness and simplicity are prerequisites, since the case-handling operation is usually a nonprofitable adjunct to the manufacturing operation. Where the case-handling equipment is elaborate and complex, there inevitably arises the possibility of frequent breakdowns which require the services of a skilled mechanic. With the apparatus of the instant invention, the arrangement is both simple and rugged, and furthermore is adapted to cooperate with a continuously-moving conveyor, so that the elaborate apparatus for an intermittently operative conveyor is dispensed with.

A further object is to provide in an apparatus of the character described a novel destacking mechanism which again is characterized by simplicity of operation and ruggedness in arrangement so as to effectively avoid unprofitable work stoppages. Other objects and advantages of this invention can be seen as this specification proceeds.

The invention will be described in conjunction with an illustrative embodiment in the accompanying drawings, in which:

FIG. 1 is a fragmentary top plan view of a case-handling system incorporating teachings of this invention;

FIG. 2 is a sectional view taken along the line 2—2 of FIG. 1 and which is particularly concerned with the depalletizing operation;

FIG. 3 is a fragmentary top plan view of the apparatus seen in FIG. 2 and thus corresponds essentially to a portion of FIG. 1 but which shows the depalletizer structure in enlarged and greater detail;

FIG. 4 is a side elevational view of a case-destacking apparatus such as is generally depicted in FIG. 1, the view in FIG. 4 being taken along the line 4—4 of FIG. 1;

FIG. 5 is the entering end elevational view of the destacking apparatus seen in FIG. 4, and corresponds to a view taken along the line 5—5 of FIG. 1—this providing a partial sectional view, inasmuch as the line 5—5 interrupts a conveyor seen in FIG. 1;

FIG. 6 is an enlarged fragmentary elevational view of the lower portion of FIG. 5 and showing the portion of the destacking mechanism arranged for elevating cases so as to destack the same;

FIG. 7 is a view similar to FIG. 6 but showing the operative elements thereof in a different condition; and FIG. 8 is a side elevational view, partially in section, of apparatus operative to shift cases between a conveyor and pallet and, as such, corresponds to the view designated by the line 8—8 of FIG. 1.

In the illustration given, and with initial reference to FIG. 1, the letter A designates a pallet which is partially loaded with cases B. Under the operation of a pusher device P' (seen in side elevation in FIG. 8 and described in detail in the above-mentioned application of Warren Du Broff), stacks of the cases B are shifted laterally and onto a moving conveyor C. As seen in FIG. 1, the conveyor C is moving to the right, and ultimately conveys the stacked cases to a destacking mechanism D.

In the detacker, which can be seen in greater detail in FIGS. 4–7, a stack of cases is "broken down" into single cases, and one such case E is seen in FIG. 1. The unstacking mechanism D is a modification of the apparatus seen in Emil E. Hageline application, Serial No. 756,331, filed August 21, 1958, and reference may be had to that co-owned, copending application for details of construction not herein given.

Interposed between the pallet A and the conveyor C is a depalletizer mechanism F, which is seen in greater detail in FIGS. 2 and 3 hereof. The depalletizer mechanism F facilitates the proper transferences of cases B from the pallet A to the moving conveyor C, and eliminates the need for an intermittent operation of the conveyor C.

An alternative arrangement of elements can be seen in FIG. 1, particularly the top and central portions thereof. In FIG. 1, a second conveyor C' is seen, and this conveyor is equipped with an upstacking mechanism which is schematically represented and designated by the letter G. The upstacking mechanism may be the form seen in the co-owned, copending application of Warren Du Broff, Serial No. 741,622, filed June 12, 1958.

The conveyor C' may lead from a packaging or bottling apparatus (not shown), and the upstacker G is effective to consolidate individual cases into vertical stacks. As stacks issue from the upstacker G and are conveyed horizontally on conveyor C', they encounter an obstruction H by which the forward movement of the cases is halted. Thereafter, a pusher apparatus P' is operative to shift the stacked cases from the conveyor C' onto a pallet A'. The pallet A' is seen to be partially loaded with completed cases B' and empty cases B. As additional stacks of filled cases B' are pushed by the pusher P' onto the pallet A', the empty cases B are moved onto the conveyor C and this is facilitated by a second depalletizer F'. Thus, it is possible to position a pallet between two conveyors with the pallet loaded with cases B which are to be filled and during the unloading operation simultaneously load the pallet with filled or completed cases.

Reference is now had to FIG. 8, which shows the pusher P' in side elevation. It will be appreciated that the pusher P is essentially similar, so that the explanation herein given relative to the pusher P' is applicable to the pusher P.

The pusher P' includes a frame 10, which can be conveniently supported on the floor 11, and which extends under the conveyor C' as at 12. The frame 10 supports a subframe 13 for movement transversely across conveyor C' to move the stack of cases B' therefrom and onto the pallet A'.

The frame 10 is generally rectangular in plan view and centrally provides a platform or pedestal 14 on which is supported a motor (not shown). The motor or other prime mover is coupled to a pinion 15 suitably rotatably mounted on the frame 10 and which is operative to engage a rack 16 provided on the subframe 13. The cooperation of the pinion 15 and the rack 16 results in the above-mentioned transverse movement of the subframe relative to the conveyor C'.

Each movement of the subframe 13 results in engagement of a star wheel 17 by an actuating dog 18. The star wheel 17 is provided on the frame 10, while the dog 18 is provided on the subframe 13. After a predetermined number of reciprocations of subframe 13, the star wheel 17 is effective to energize a holding circuit (not shown), which prevents further operation of the palletizer P' until a new pallet A' has been provided. The foregoing brief description of the palletizer P' may be amplified from a consideration of the above-mentioned Du Broff application, Serial No. 792,829.

Referring to FIGS. 2 and 3 of the drawing, the depalletizer F is seen in enlarged form. In these views, the numeral 19 designates a frame which is seen to be located beside the pallet A. The pallet A is desirably supported above the floor 11 so that the upper surface of the pallet A is above the upper smooth surface of the conveyor C. For this purpose, a pedestal 20 may be provided.

In the illustration given, the frame 19 additionally provides a support for the conveyor C, and for this purpose, the frame 19 is equipped with longitudinally-extending channel tracks 21. The tracks 21 serve as guides for the conveyor chains 22 (see FIG. 1). The palletizer F serves as a transfer mechanism in supporting a case B as it is pushed laterally off of the pallet A and toward the conveyor C. The depalletizer F includes a subframe or rockably-mounted element 23 which performs this supporting function. In one position of the frame 23, the upper support portion of this subframe is horizontally aligned with the top of the pallet, as can be appreciated from the dotted line configuration of the subframe 23 in FIG. 2 and which is designated by the numeral 23a. The subframe 23 thus provides a continuation of the supporting surface of the pallet A and a case B is readily transferred thereto. The alternative position of the depalletizer F is seen in solid line in FIG. 2 and there the upper surfaces of the depalletizer F are seen to be positioned below the upper surface of the conveyor C. As the subframe is rocked to the second or solid line position, the case B is deposited on the moving conveyor. Although only a single case has been illustrated as being transferred in FIGS. 2 and 3, it will be appreciated that a stack of vertically superposed cases may be transferred with equal facility.

The main frame 19 of the depalletizer F is seen to include vertical members 24 which are positioned on opposite sides of the conveyor C. The vertical members 24 are connected together and rigidified by transverse members 25 and 26 (see FIG. 2). The frame made up of members 24–26 is duplicated at the other end of the frame 19, but which is not seen in FIG. 3 for the sake of conserving drawing space. A longitudinally-extending stringer 27 is provided to tie the end frame portions together and additionally restrain lateral movement of the case B as it is transferred from the pallet A to the conveyor C, all of which can be readily appreciated from a consideration of FIG. 2.

The cross member 25 is equipped with a pair of bearings 28, and similar bearings are provided at the other end of the frame 19, the bearings 28 cooperating to provide a journal structure in combination with longitudinally-extending shafts 29. One of the shafts 29 is equipped with a crank arm 30, which in turn is pivotally connected to the piston rod of a fluid pressure-actuated cylinder and piston rod unit 31. The unit 31 is pivotally connected as at 32 to the cross member 25.

Each of the shafts 29 is equipped with a crank arm 33 which is fixedly connected thereto at one end, and at the other end is pivotally connected as at 34 to the subframe 23.

As the piston (not shown) of the cylinder and piston rod unit 31 is moved, the subframe 23 is moved through an arc, the end positions of which are designated in FIG. 2 by the solid and dotted line configurations.

The subframe 23 has end portions 35 which are essentially E-shaped in elevation. Each arm of the E-shaped plate, these arms being designated in FIG. 2 by the numerals 35a, 35b and 35c, provide a rotatable mounting for a supporting roll 36, three of which are provided. Again, it is to be appreciated that the "downstream" end of the frame 19 and, more particularly, the subframe 23, is equipped with a like structure, in other words, a second E-shaped plate 35. This provides the support for the other end of the rotatably-mounted roll 36.

One of the rolls 36 is positioned between the pallet A and the conveyor C, while the remaining rolls 36 are positioned between the parallel chain runs 22. The depalletizer F operates in conjunction with the pusher P, and the activities of these two mechanisms can be readily coordinated. The depalletizer F has its subframe 23 positioned in the condition designated 23a in FIG. 2 prior to the initiation of a pushing movement by the pusher P. Thus, the rolls 36 are horizontally aligned with the top surface of the pallet A so as to expeditiously receive a stack of cases B therefrom. Once the pushing or shifting operation has been performed, it is then possible to complete the transfer of the cases B to the conveyor C. For this purpose, the return of the subframe 13 of pusher P may energize a microswitch supplying compressed air or other pressurized fluid to the unit 31, the pressurization resulting in extension of the piston rod of the unit 31 so as to pivot the subframe 23 to the solid line position seen in FIG. 2.

Shortly after the cases B have been deposited on the conveyor C, the subframe 23 is returned to the dotted line condition seen in FIG. 2 so as to have the rolls 36 in a position for transferring another series of cases.

After the stacked cases have been transferred from the pallet A to the conveyor C, they are conveyed by the conveyor C to the downstacker D. The destacker D can be seen in enlarged views in FIGS. 4–7. Throughout the operation of the pusher P, the depalletizer F, and the downstacker D, the conveyor C is continuously moving, which is especially advantageous since no elaborate stop-start or interrupted movement apparatus is required.

The destacker D is equipped with a generally rectangular frame designated by the numeral 37. In the illustration given, the frame 37 is a channel network having vertical columns 38, 39 and 40 on each side of the chain conveyor C. The vertical column members 38–40 (see FIG. 4) are rigidly united by means of longitudinally-extending horizontal members 41 and 42. The vertical column members 38 and 39 are additionally rigidified by a longitudinally-extending member 43. The side frameworks provided by elements 38–43 are tied together by transverse members 44, 45, 46 and 47 (see FIG. 5).

Mounted for vertical reciprocation within frame 37 is a subframe generally designated by the numeral 48 (see FIG. 4). Subframe 48 includes a pair of spaced-apart, longitudinally-extending side members 49 (see also FIG. 5), which are arranged on opposite sides of the frame 37. The side members 49 are equipped with vertically extending members 50 (see FIG. 5), which are connected together by means of a transverse member 51. Each vertical column member 39 is equipped with a guide post 52, and the subframe 48 carries grooved rollers 53 which bear against these guide posts to aid in guiding the subframe during its vertical movement. A similar guide post and grooved roller arrangement (not shown) is provided at the entering end portion of the subframe 48.

Vertical movement of the subframe 48 within the frame 37 is achieved by virtue of a motor-operated crank mechanism, designated generally by the numeral 54, and which includes a crank member 55 rotatably secured at one end thereof to the cross member 51. The other (upper) end of the crank member 55 is pivotally secured to a bellcrank 56. The bellcrank 56 is secured to a longitudinally-extending shaft 57. The shaft 57 is supported for rotation in a pair of pillow blocks 58 (see FIG. 4).

The shaft 57 is equipped with a sprocket 59 which is engaged by a chain 60. The chain 60 is powered by a sprocket 61 provided as part of a speed reducing mechanism 62. The speed-reducing mechanism is coupled by means of an electric clutch 63 to an electric motor 64.

Means are provided on each longitudinally-extending member 49 of subframe 48 for gripping a case second from the bottom of a vertical stack of cases. The gripping means illustrated include a pair of spaced-apart gripping pads 65 and 66 (see FIG. 6). The pad 65 is essentially flat and is mounted only for vertical movement, i.e., non-pivotally mounted. On the other hand, the pad 66 is equipped with a convex or outwardly arcuate contour and is pivotally mounted on the member 49 associated therewith by means of an arm 67.

The element 49 also provides a pivotal mounting for a latch member 68. The latch member is equipped with a dog or detent 68a, which is adapted to engage a laterally-extending projection 67a on arm 67. As the subframe 48 and, therefore, the members 49, are raised through the action of the motor and crank mechanism, the pad 66 is retained in the position seen in FIG. 6 until after the latch member 68 engages the upset member 69. This condition is seen in FIG. 7, and, when this occurs, the arm 67 is free to pivot in a clockwise fashion under its own weight to the position seen in FIG. 7. There, the pivotally-mounted pad 66 is seen to be in clamping engagement with the case B second from the bottom of a stack of vertical cases. This is effective to urge the case B against the nonpivotally-mounted pad 65 so that all but the bottom of a vertical stack of cases can be elevated. Once this occurs, the lowermost case travels out of the destacker D under the influence of the continually-moving conveyor chains 22.

During the downward movement of the members 49, the latching member 68 finally clears the upset or latch release member 69 and is urged in a counterclockwise direction (see FIG. 7) under the influence of a spring 70 (see FIG. 4). However, at this juncture, the latching dog 68a is above the latching bar or lug 67a. Cocking of the mechanism is achieved through the engagement of the post 70 with the rearwardly-projecting arm 71 on pad 67.

Cocking is achieved at the lowermost stage of travel of the members 49, and during this cocking action, the convex surface of the pad 67 slides against the case B in depositing the now-reduced stack of cases on the conveyor chains 22.

The signal which causes the subframe 48 to reciprocate is developed by the contact of a stack of cases with a switch-actuating plate 72 (see FIG. 5). The depression of the plate 72 by the second from the bottom of a stack of cases B operates a switch which in turn energizes the electric clutch 63. The electric clutch 63 in turn couples the motor 64 into the speed-reducer 62 and thus operates the bell crank mechanism 54. The clutch 63 is energized only for a portion of the cycle of movement of the bell crank mechanism 54 so that the motor 64 is disengaged from the power train at about the time the stack of cases is at maximum elevation. This insures that there will be ample time for the lowermost case E to issue from the destacker D. In doing so, the case E contacts a switch arm 73 which reactivates the clutch 63 for the remainder of a cycle of operation.

Reference to FIG. 4 shows that the latch release member 69 is secured to a supporting element 74 rigidly secured to the vertical elements 39 and 40 of frame 37. The release element 69 is locked within a bracket 75 on the element 74 by means of a spring lock mechanism 76. The release element 69 is seen to engage a sidewardly-extending projection 68b of the latch element 68.

In the operation of the apparatus just described, the conveyor C is arranged to move continually and has an upper surface suitable for sliding movement of cases thereon—as when the cases are impeded, the chain conveyor can continue to travel thereunder. The pusher P and the depalletizer F achieve the transfer of stacks of cases B from the pallet A to the conveyor C while the conveyor is running, and further, the destacker D performs the destacking operation also while the conveyor C is in operation.

While, in the foregoing specification, we have set forth a detailed description of an embodiment of the invention for the purpose of illustration thereof, many variations in the details herein given will be appreciated by those skilled in the art without departing from the spirit and scope of the invention.

We claim:

1. In apparatus for transferring a case stack from a pallet, or the like, to a continuously traveling conveyor,
   (A) a horizontal top-providing pallet,
   (B) a continuously traveling pair of spaced-apart conveyor chains each having a smooth upper surface positioned for horizontal travel a spaced distance below the pallet top and on one side of said pallet,
   (C) a pusher positioned on the other side of said pallet and having horizontally reciprocable means to push a case stack from said pallet onto said conveyor chains, and
   (D) a transfer device to support a case stack being pushed by said means, said device comprising
      (i) a frame supporting said conveyor chains,
      (ii) a subframe pivotally mounted on said frame and equipped with rotatably supported rolls having their axes extending parallel to the direction of conveyor chain travel, one of said rolls being positioned between said pallet and said conveyor chains and another roll being positioned between said conveyor chains, said roll axes being coplanar,
      (iii) a cylinder and piston rod unit pivotally mounted on said frame for moving said subframe,
      (iv) a pair of identical rigid linkage elements pivally connected at one end to said frame and at the other end to said subframe, and
      (v) means coupling said piston rod and said elements so that movement of said piston rod results in movement of said subframe over an arcuate path with the roll axes plane always being horizontal.

2. The structure of claim 1 in which said linkage elements have their lengths disposed at an angle to the horizontal so that said subframe moves over said arcuate path sidewardly and downwardly relative to said conveyor chains at about the same rate.

3. In apparatus for transferring a case stack from a pallet, or the like, to a continuously moving conveyor,
(A) a pallet having a horizontally disposed flat top,
(B) a conveyor frame beside said pallet and supporting a pair of spaced-apart, smooth-topped, horizontally travelling conveyor chains, said frame having vertically spaced-apart horizontal members with the conveyor chain supported on the upper of said members,
(C) reciprocal means beside said pallet for pushing a case stack from said pallet toward said conveyor chains,
(D) a subframe movably mounted on the lower horizontal members of said frame and positioned within said frame, said subframe including
 (i) upstanding rotatably-supported rolls having their axes all in a horizontal plane, and
 (ii) a pair of depending pivotally connected linkage elements, said elements being pivotally connected to said lower horizontal members, and
(E) means for moving said subframe, including
 (i) a cylinder and piston rod unit pivotally connected to one of said lower horizontal members and equipped with a link rigidly joined to one of said linkage elements.

References Cited in the file of this patent
UNITED STATES PATENTS

| | | |
|---|---|---|
| 1,882,436 | Mojonnier | Oct. 11, 1932 |
| 2,156,248 | Wegner | Apr. 25, 1939 |
| 2,328,388 | Morgan | Aug. 31, 1943 |
| 2,434,411 | Johnson | Jan. 13, 1948 |
| 2,904,163 | Golding | Sept. 15, 1959 |